W. F. Edson
Shoe Heel Machine,
No. 2,527. Reissued Mar. 26, 1867.
Fig. 1.
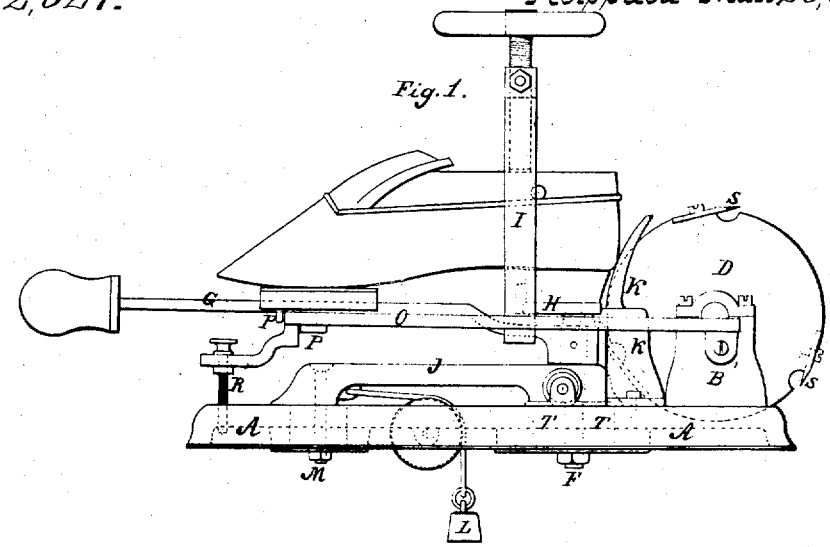
Fig. 2.
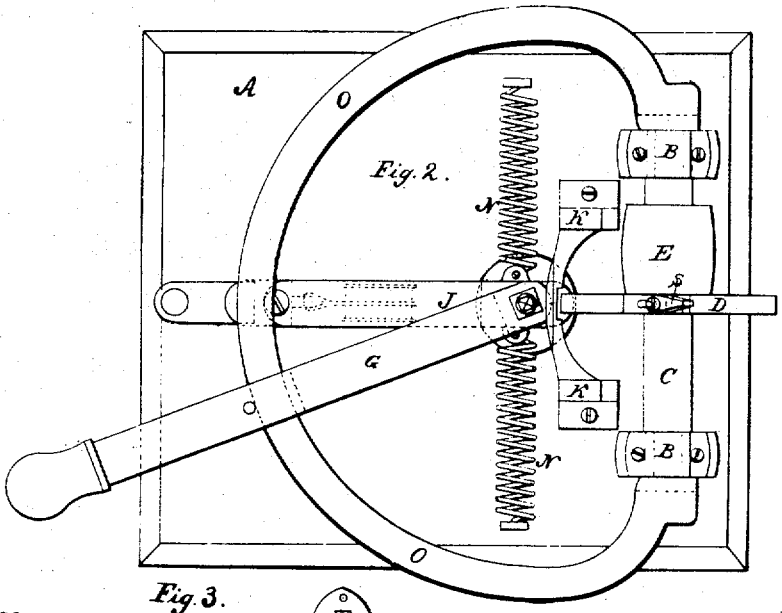
Fig. 3.
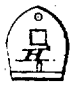
Fig. 4
Witnesses
Geo W Adams
Geo A Knott
Inventor
Wm F Edson

United States Patent Office.

THE McKAY HEELING MACHINE COMPANY, OF BOSTON, MASSACHUSETTS, ASSIGNEES BY MESNE ASSIGNMENTS OF WILLIAM F. EDSON.

*Letters Patent No.* 25,326, *dated September* 6, 1859; *improvement added July* 24, 1860; *reissue No.* 2,527, *dated March* 26, 1867.

IMPROVED MACHINE FOR CUTTING AND FINISHING SHOE HEELS.

The Schedule referred to in these Letters Patent and making part of the same.

TO ALL WHOM IT MAY CONCERN:

Be it known that WILLIAM F. EDSON, of the city and county of Philadelphia, in the State of Pennsylvania, invented certain new and useful improvements in Machines for Cutting and Finishing the Heels of Boots and Shoes in the process of manufacture, either on or off from the soles; and it is hereby declared that the following is a full, clear, and exact description of the construction and operation of the same, reference being had to the accompanying drawings, making part of this description, in which, on one sheet—

Figure 1 is a side elevation of the machine, showing the shoe in position.

Figure 2 is a plan of the machine without the shoe, and the apparatus for clamping it in position.

Figures 3 and 4 are respectively a side view and a plan of the forming plate, guide, or shaper, to be temporarily secured to the tread of the heel.

On the other sheet—

No. 1 shows, in side elevation, an additional improvement, illustrating a modified means of clamping the shoe and a flexible counter-grasping guard, or former, or shaper.

No. 2 is a side view, taken somewhat in perspective, of said flexible forming or shaping counter-guard, with the rod or strap by which it is operated.

No. 3 is a top view of the same, showing the connection of said strap therewith, and the means by which the flexible guard is expanded and contracted.

No. 4 is a perspective view of the rod or strap which works the flexible former, and of the means by which its longitudinal movements are made to expand and contract the same.

The other detached views are details of the flexible counter-guard former, and parts immediately therewith connected, by which the same is worked.

In cutting and polishing heels by machinery, and in making them conform to some given shape or pattern, it is desirable, for the sake of simplicity in the mechanism, and for its efficient action, to have such patterns temporarily affixed to the treads of the heels to be wrought upon, or also to make use of that part of the counter immediately adjoining each heel for the pattern to govern the action of the cutting or polishing device in shaping and finishing the heel. But when the counter near the heel is used as a guard or fender, the leather or other material of which the upper of the boot or shoe is formed, is apt to be abraded or marked by frictional contact therewith, so that it is desirable to interpose a thin flexible fender between the counter and that part of the mechanism which would otherwise bear directly upon said counter. And the principal parts of this invention may be stated to consist in, first, the combination, with a cutting, grinding, or polishing device, arranged to operate upon a boot or shoe heel, of a guide-piece or former, when located upon the tread of the heel, and arranged and operating to limit the action of the cutting, grinding, or polishing device, and thus give a defined shape to the heel, corresponding to the shape of the guide; second, such an organization and arrangement of the mechanism as shall, when a heel is secured in place on a boot or shoe, and is submitted to the action of said mechanism, by contact with that part of the counter near the heel to be operated on, govern and determine the shape or curved outline of the heel, and without liability of having the counter cut, ground, or polished by the instrumentality employed to shape or finish the heel; third, the employment, in connection with a cutting, grinding, or polishing mechanism for operating on heels, when secured on boots or shoes, of a flexible fender, arranged to conform by clasping and yielding to the shape of a counter near a heel, and designed to protect the counter from abrasion by the parts of the mechanism bearing thereupon.

Referring now to the drawings for a description of the construction of the embodiment of this invention, A denotes the bed-plate, on which are bearings, B, in which the shaft C is mounted, carrying a cutter-wheel, D; said shaft and cutter being rapidly rotated by the action of a belt on the pulley E. J is an arm placed on the bed-plate under influence of the weight L, or an equivalent spring, and the springs N N, said springs tending to keep the arm J in line with the cutter, and the weight L tending to move the arm toward the cutter. In the bed-plate, toward the front thereof, there is a slot which receives the bolt or pin M, this serving to confine the arm J, though permitting it to move back and forth on the bed-plate. There is also in the bed-plate, toward the rear thereof, a circular aperture, T, through which projects a stud or upright post, F, fixed in the rear of arm J, there being a large plate or washer covering the aperture on the under side of the bed-plate and confined to the post F, so as to keep the rear of the arm J in contact with the bed-plate, while permitting it to be moved in the direction and to the extent allowed by the size of the apertures referred to in the bed. To the upper part of this post F is secured the hand-lever G, so that thereby the post may be rotated in the arm J. The pattern or forming plate H, which has the outline desired for the tread of the heel, is so attached to the post F that it is rotated therewith and with lever G, and may be changed for other patterns or formers of various sizes and shapes. Fixed to the lever G, so as to turn with it, is a yoke, I, provided with a screw by which the boot or shoe is clamped in its place, so as to be rotated on the axis of post F, by movement of lever G. The bow O is pivoted in such a manner that it can be raised and lowered by turning the screw R, and as the lever G rests on the bow O, the angle thereof and the angle of the heel, and of the position of the shoe, will depend on the adjustment made by screw R. The shield K is so arranged, with reference to the knives S S in the cutter-wheel, that the counter of the shoe or the former or pattern H, abuts against the shield, preventing either of them from coming into the path of rotation of the edges of the knives, and thus the counter and the tread-former, or pattern, are prevented from being cut by the action of the knives, or from being acted upon by any grinding or polishing-wheel of proper diameter when made to take the place of the cutter-wheel. If the operator uses a tread-former or pattern too narrow, or set too far forward on the heel, then the shape of the heel will be determined in whole or in part by the action of the shield K, on the counter of the shoe, and, if desirable, guides P P may be applied to the hand-lever G, as seen only in figs. 1 and 2, in such a manner that the bow alone, or in conjunction with the tread-former, the counter above, and the shield K, controls the presentation of the rough heel to the rotating-wheel.

The operation of the mechanism already described is as follows: The former H being fixed by pins therein on the tread of a heel, the former is then placed on the end of post F, the square end thereof fitting the square hole in the former, and the boot or shoe to which the heel is affixed is clamped in place on the lever G by the screw in the yoke I, the lever G being at the time either in its extreme right or left position, and the heel of the shoe being removed as far as necessary from the wheel D, this being permitted by the openings in the bed and by the yielding of the weight L and springs N in their influence on the piece J. The cutter-wheel is then set in rapid rotation, and the shoe being left free to the influence of the weight L and springs N, the heel thereon moves into contact with the knives of the cutter-wheel, which removes at one place on the extreme front of one side of the heel the surplus material thereof, till the shield K prevents further movement of the heel by the abutment thereupon either of the tread-former or of the counter, or both. Now by moving the lever around on the bow O, the cutter acts to remove the surplus material from the entire curved contour of the heel. If it is desired to increase or diminish the angle of the heel, or the amount of its bevel, this is effected by raising or lowering the bow O by the adjusting screw R. In moving the lever G to the extreme right or left of the transverse centre of the bow O, the guides P P force the post F aside from the centre which causes the cutter to form a flattened or straightened curve on the side of an elongated heel. Without the guides P P, the operator can effect the same result by pressure on the lever G exerted toward the centre of the machine. The springs N N act to return the post F to the centre line of the machine, when not prevented through the lever G. The heel being cut to shape, the cutter-wheel may be removed, and grinding and burnishing-wheels may be substituted in the order named, for the purpose of giving a finished surface to the heel, the manipulations of the operator being as before described. When it is desired to protect the counter from abrasion consequent on its frictional contact with the shield K, the flexible former U is employed, it being preferably made of thin sheet metal, of sufficient substance not to be indented by the contact which it receives with the shield in the action of the machine, and yielding enough to be drawn snugly to the counter, so as closely to clasp it and to be sprung open in order to permit the taking out and putting in of a shoe. The drawings illustrating this part of the invention are those designated No. 1, &c., instead of Figure 1, &c., and the parts which are common in both Nos. and Figures are designated by the same letters. The post F, former H, lever G, and yoke I, being as before described, there is arranged on lever G a lever, Y, which works a slide, V, on lever G, this slide or rod having fixed at one end plates W which have inclined slots cut therein, said slots embracing pins which are fixed to the flexible former U, so that it will be obvious that when the lever Y is worked in one direction, the former U will be opened, and when worked in the opposite direction it will be closed or contracted. The lever Y is kept where placed by a suitable ratchet rack, seen in No. 1, and in said drawing the eccentric Z is clearly seen as to its arrangement and method of operation in holding a boot or shoe in place.

*Claim.*

In combination with a cutting, grinding, or polishing device for operating to shape or finish a boot or shoe heel, and where a movement is given to such device or to the heel, relative one to the other, a former or pattern located on the tread of the heel, and operating in connection with a shield, against which it abuts, to govern in whole or in part the form of the heel.

Also, in a heel-shaping or finishing mechanism, such an arrangement of a shield, with reference to the cutting, abrading, or polishing device, and to the counter of a boot or shoe having a heel to be cut, ground, or polished, as will, by the abuttal of the said counter against said shield govern in whole or in part the form of the heel.

Also, the combination with a heel-shaping or with a heel-finishing mechanism, of a flexible counter-protecting band, arranged to operate substantially as described.

JOHN HILL,
*President of the McKay Heeling Machine Company.*

Witnesses:
J. B. Crosby,
Francis Gould.